April 18, 1944.  F. G. HUGHES  2,346,758
BRAKE
Filed March 7, 1941  2 Sheets-Sheet 1
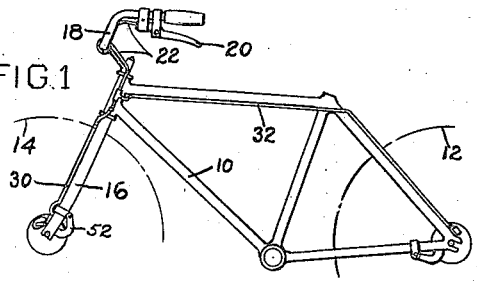
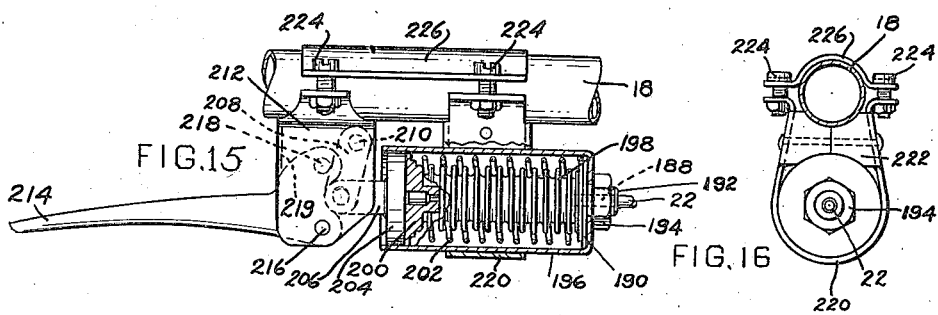
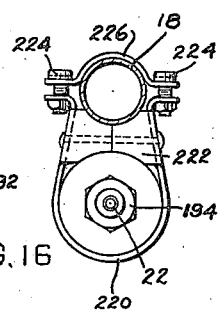
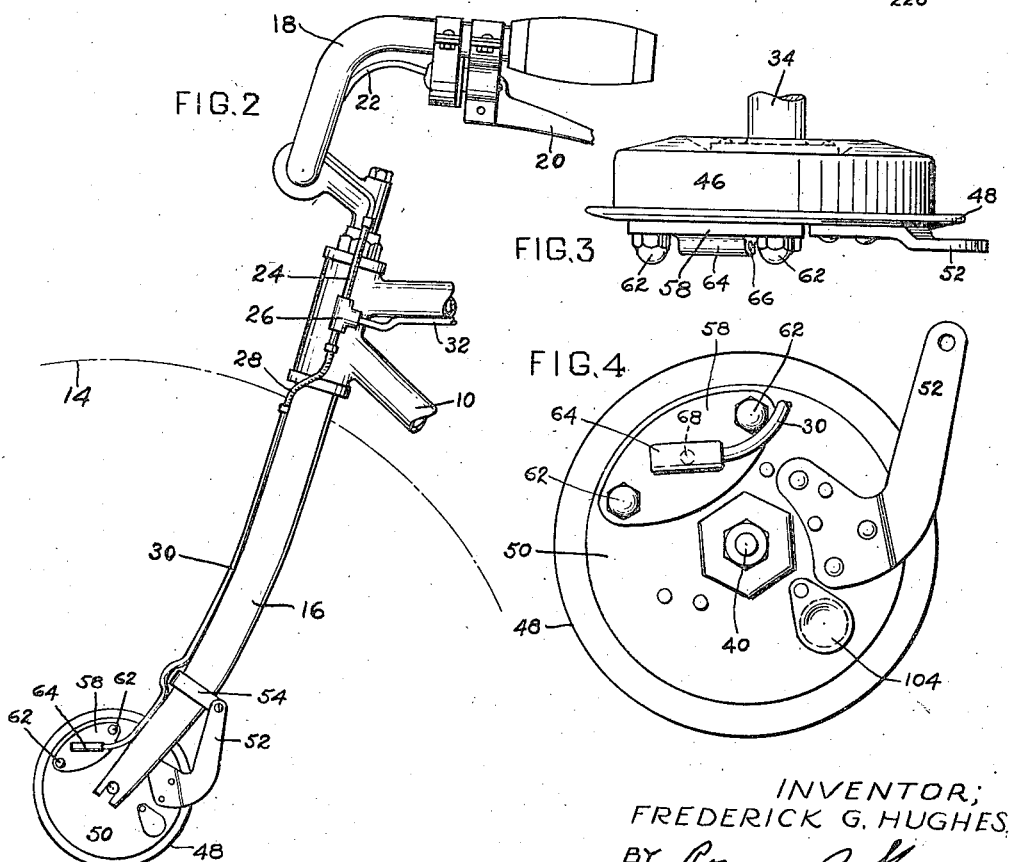
INVENTOR;
FREDERICK G. HUGHES,
BY Romeyn A. Spare
HIS ATTORNEY

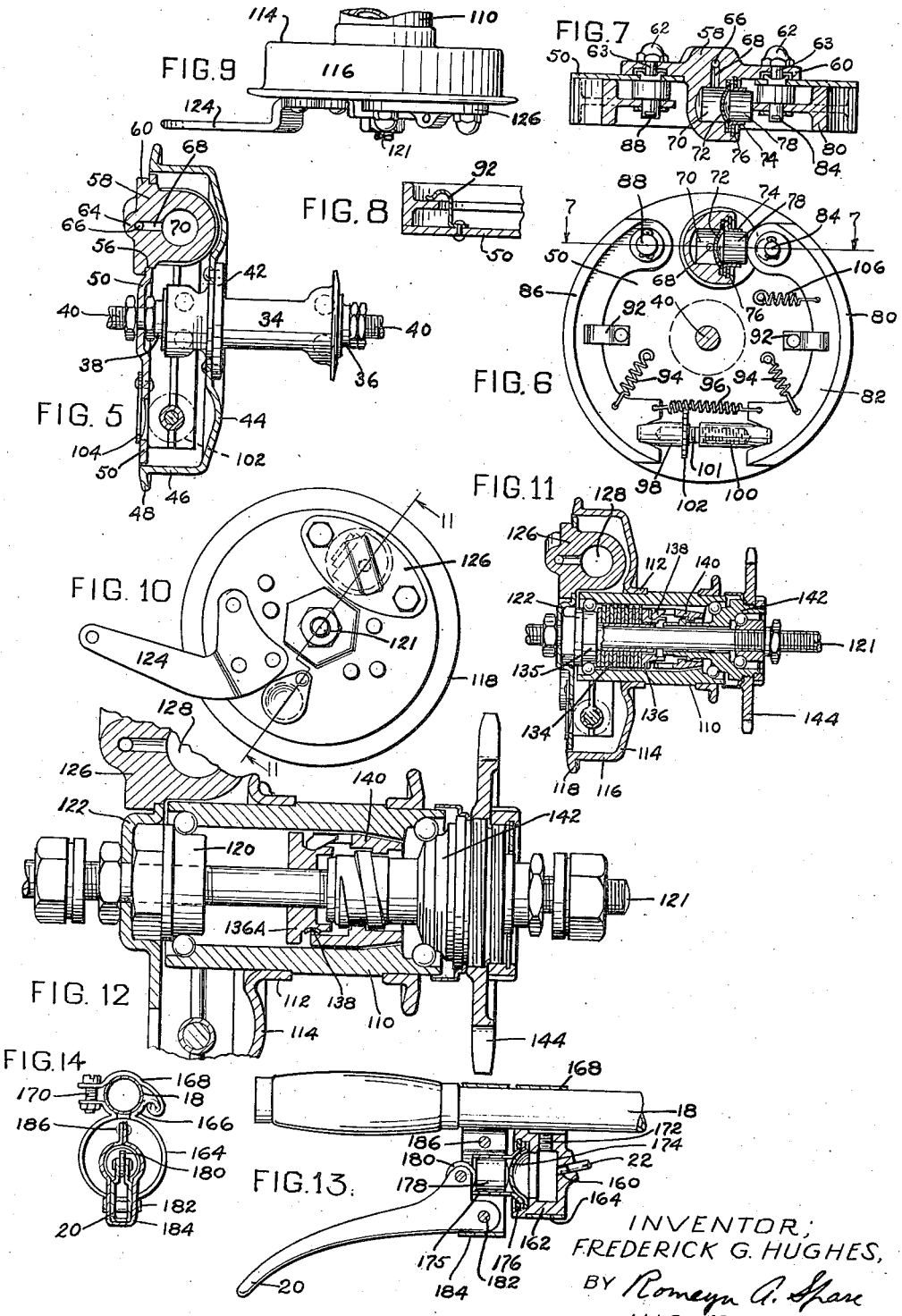

Patented Apr. 18, 1944

2,346,758

UNITED STATES PATENT OFFICE 2,346,758

BRAKE

Frederick G. Hughes, Bristol, Conn., assignor to General Motors Corporation, Detroit, Mich., a corporation of Delaware Application March 7, 1941, Serial No. 382,187

6 Claims. (Cl. 188—152)

This invention relates to fluid pressure operated brake mechanisms and more particularly to a hydraulic brake mechanism for the front and rear wheels of a bicycle.

An object is to provide an improved and simplified fluid pressure operated brake for the front and rear wheels of a bicycle. Another object is to provide a completely sealed fluid pressure control mechanism for a bicycle brake and which is easily demountably secured as a unit to the bicycle and to the brake mechanism in such a manner that no breakage can occur and the fluid remains sealed within the control mechanism. Another object is to provide a completely filled and sealed conduit system which is detachably secured without leakage to a brake control and to brake mechanisms in the front and rear wheels of a bicycle.

To these ends and also to improve generally upon devices of this character, the invention consists in the various matters hereinafter described and claimed. In its broader aspects, the invention is not necessarily limited to the specific construction selected for illustrative purposes in the accompanying drawings in which Figure 1 is a diagrammatic showing of a bicycle having my braking mechanism associated with both wheels;

Figure 2 shows the brake control mechanism associated with the front wheel of a bicycle;

Figure 3 is a fragmentary plan view of a front wheel hub and associated brake mechanism;

Figure 4 is an end elevation of a front wheel brake mechanism;

Figure 5 is a diametrical section through my front wheel brake mechanism and showing the associated wheel hub;

Figure 6 is an end elevation of the front wheel brake assembly;

Figure 7 is a cross sectional view taken along the line 7—7 of Figure 6 and looking in the direction of the arrows;

Figure 8 is a fragmentary sectional view showing a brake band and its associated guide clip;

Figure 9 is a fragmentary plan view of a brake mechanism on a rear wheel hub;

Figure 10 is an end view of a rear wheel brake mechanism;

Figure 11 is a diametrical section through a rear wheel mechanically operated coaster brake which also embodies a hydraulically operated brake;

Figure 12 is an enlarged diametrical section showing a free-wheeling rear driving hub which includes a hydraulic brake mechanism;

Figure 13 is a fragmentary sectional view showing one embodiment of a manual control for the hydraulic brake mechanism;

Figure 14 shows the mounting for the manual control of Figure 13;

Figure 15 is a fragmentary sectional view of another embodiment of a manual control for the hydraulic brake mechanism; and Figure 16 is an end view of the control of Figure 15.

The numeral 10 indicated a bicycle frame having a rear wheel 12 journalled in the rear fork and a front wheel 14 journalled in the front steering fork 16 which is steered by the usual handle bars 18. A hand lever 20 mounted adjacent to one of the grips produces pressure in a closed hydraulic system completely filled with a substantially non-compressible brake fluid such as a suitable oil, as will appear, to apply brakes to both the front and rear wheels. The system includes the conduit 22 mounted on the handle bars to swing therewith and connected to a flexible conduit 24 which leads to a coupling 26 mounted on the frame. Another flexible conduit 28 leads from the coupling 26 to a conduit 30 fixed to the front fork and swingable therewith. This branch controls the front brake while a branch conduit 32 connected to the coupling 26 and mounted on the frame controls the rear brake. As will appear, the conduit system is a unitary structure which is detachable from the bicycle and capable of shipment as a unit without leakage of the pressure fluid.

A front wheel hub 34 is journalled by ball bearings on the usual adjustable bearing cones 36 and 38 threaded on a front axle 40 which is clamped in the front fork 16. The hub has a flange 42 to which is riveted an inwardly extending dished flange 44 on a brake drum 46 which terminates in a spoke flange 48. Fixed against the cone 38 by a nut is the outwardly cupped center portion of an anchor plate 50 which closes the open side of the brake drum. To insure that the anchor plate shall not turn on the axle, a bent anchor arm 52 is riveted to the anchoring plate and has its end secured by a clip 54 to the front fork 16.

The anchor plate has an opening 56 through which a fluid holder or brake energizing casing 58 projects, the casing having a flange 60 fitting the side of the anchor plate and removably fastened thereto by nuts 62 threaded on shouldered studs 63 which are carried by the anchor plate 50. A hollow protuberance 64 has a port 66 at one end to receive the conduit 30, the port 66 meeting a port 68 which extends into a cylindrical receptacle or cavity 70. One end of the cavity has a solid wall while the other end is counterbored to form a seat for the rim of a flexible diaphragm 72 held firmly against the seat by a flanged sleeve 74 and a dished ring 76 having ears expanded into a groove. The diaphragm is preferably composed of "Neoprene" which has many of the characteristics of rubber but is more resistant to oil and heat. Sleeve 74 acts as a cylinder or guide for a plunger 78 whose rounded end engages the diaphragm. The movement of the plunger actuates brake shoes as will now appear.

A brake shoe 80 having a central flange or web 82 is mounted on a stud 84 which projects from one of the shouldered screws 63 and has a cotter pin and a washer holding the web. The web 82 has an oversize hole for the stud 84 to allow some bodily motion of the brake shoe. A companion brake shoe 86 is pivoted on a stud 88 which is larger than stud 84 so that this brake shoe can only pivot thereon without moving bodily. Spring clips 92 engage the webs to urge the brake shoes towards the anchor plate. Coil springs 94 urge the brake shoes away from the brake drum 46 and a coil tension spring 96 connects the ends of the shoes to urge them towards one another. The shoes have companion pyramidal sockets one to receive a screw supporting member 98 and the other to receive an internally threaded member 100 which co-operates with a screw 101 journalled in member 98 and having an adjusting head 102. The head 102 is accessible for adjustment through a hole in the anchor plate when a cover plate 104 is swung to one side.

A coil spring 106 tends to move the brake shoes to contracted or inoperative position when fluid pressure in the receptacle or cavity 70 is relieved. When pressure is applied from the hand lever and conduit system, the plunger 78 moves the shoe 80 outwardly against the brake drum which is rotating forwardly and, by its rotation and frictional engagement, tends to expand the brake shoes and apply them more forcibly. It is important to note that the hydraulic system is a unitary device which can be shipped separately from the bicycle, or it can be detached therefrom without bleeding or losing the brake fluid in either case. For instance, removal of the nuts 62 allows the fluid holder or casing 58 to be disconnected from the brake anchor and pulled out of the latter sidewise, the conduit 30 having sufficient flexibility for this. Hence the front wheel can be removed from the forks, as for repair of the tire, yet the detached end of the system remains closed by the diaphragm 72. The rear wheel can be similarly detached, as will appear, without leakage from the corresponding conduit 32 and the hereinafter described power applying device has a similar diaphragm and is demountably fastened on the handle bars as part of the unit or system without leakage.

A free-wheeling rear wheel hub 110 has a shouldered seat on which is secured a sleeve 112 on a dished brake member 114 having a brake drum 116 terminating in a spoke flange 118. One end of the hub is journalled on a ball bearing having a cone 120 threaded on an axle 121. Clamped by a nut against this cone is the outwardly offset center portion of an anchor plate 122 which is secured by a bent anchor arm 124 and a clip to the frame. A fluid holder or brake energizing casing 126 has a cylindrical receptacle or cavity 128 and is demountably secured to the anchor plate in the same manner as the corresponding parts of the front wheel. The brake shoes are similar to those on the front wheel and operate in the same way but it is to be noted that the receptacle or cavity 128 is larger than that for the front wheel so that, when fluid pressure is produced in the conduits by the handle, the rear wheel brake will tend to go on first or with greater pressure than the front wheel brake, thus avoiding a skid.

The rear wheel hub can optionally have a conventional coaster brake as an emergency brake, this brake comprising brake discs 134 alternately keyed to the hub and to an anchoring extension of the cone 135 and being forced by a brake actuator 136 towards the cone as a result of back pedalling. Such a brake also comprises a lag spring 138, a threaded connector 140 engaging threads on a driving sleeve 142, and a chain driven sprocket wheel 144, the connector having clutching engagement with the hub for driving it, moving out of engagement with the hub for coasting, and being urged into clutching engagement with the actuator to apply the brake by back pedalling. However, such emergency brake can be omitted in which case, the brake discs are omitted as indicated in Fig. 12, together with their splines, and the member 136A is attached to the axle as by threading. Thus, forward pedalling will drive the bicycle while holding the pedals stationary or back pedalling will merely let the bicycle free-wheel.

The power to brake, as stated above, is produced by the hand lever 20. The conduit 22 enters a port 160 in a cup-shaped power casing 162 fitting in a detachable bracket or strap 164 which nearly surrounds the casing, the upper portions 166 of the strap being bent to conform to the handle bar and terminating in a lug and in a hook to cooperate with a hooked clip 168 having a clamping bolt 170. The casing has a threaded plug 172 to close a filling opening and is counterbored to form a seat for the rim of a flexible diaphragm 174 held on by a flanged sleeve 175 and a ring 176. A plunger 178 which is rounded at one end to engage the diaphragm slides in the sleeve 175 and its other end is flat to engage a roller 180 actuated by the hand lever. The roller turns on a pin connecting a pair of ears formed by making the hand lever substantially U-shaped in cross section, as by bending it up from sheet metal. The lever is pivoted on a pivot pin 182 carried by a bracket or stirrup 184 whose sides are bent around the sleeve 175 at the top and fastened by a rivet 186, the stirrup having a clip to clamp it detachably to the handle bar. The power casing 162 is detachable from the bicycle as unit with the conduit system and the connected brake energizing casings 58 and 126 and the system remains closed without loss of liquid. Thus these parts can be shipped as a unit with the proper amount of liquid separate from the bicycle and whenever a tire needs changing the corresponding wheel can be taken out of the forks without losing any liquid and by simple manipulation.

A modification of the handle actuated mechanism is shown in Figs. 15 and 16. The conduit 22 is connected to a port 188 in a plate or disc 190 which has a threaded extension 192 receiving a nut 194 by which the disc is secured to the closed end of a cup-shaped casing 196. A "Sylphon" bellows 198 is soldered to the fixed disc 190 and to a movable plate or disc 200 which is urged by a coil 202 against a piston or plunger 204. The plunger has a lug 206 which has a pin and slot pivotal connection with a link 208 pivoted at 210 to a bracket 212 detachably clipped to the handle bar. A lever 214 is pivoted at 216 to the bracket and carries a pin 218 bearing against the link 208 to force the plunger into the casing and thereby compress the bellows. The pin bears at a middle portion of the link to get ample movement of the plunger for a given movement of the lever. Obviously the actuation of the hand lever results in creating pressure in the bellows and the conduit system to apply the brakes. A stop plate 219 limits downward swinging of the lever. The casing 196 is demountably supported in a strap or stirrup 220 having a spacing block 222 rivetted to its arms and conforming to the handle bar. The ends of the stirrup are detachably secured by clamping bolts 224 and a clip 226 to the handle bar, this clip also co-operating with the bracket 212 by similar bolts. The casing may be apertured to avoid having to compress air outside of the bellows.

I claim:

1. In a fluid pressure actuated braking system for a vehicle having a frame and a plurality of supporting wheels detachably secured to said frame, a brake drum on each wheel, an anchor plate adjacent to each brake drum, brake shoes carried by the anchor plates and movable into and out of braking engagement with said brake drums, a unit handling conduit system completely filled with a pressure-transmitting fluid and transportable independently of said vehicle, means sealing said conduit system against leakage, fluid pressure actuated brake shoe operating devices in said system, and means to attach and detach the conduit system as a unit to said frame and to said anchor plate in brake shoe operating relation while said conduit system remains a fluid filled unit sealed against leakage.

2. In a brake for a rotatable wheel hub, a brake drum secured to the wheel hub and having an open end, a non-rotatable anchor plate at the open end of said brake drum and having an aperture therethrough, a brake shoe carried by said anchor plate and movable into and out of braking engagement with said drum, a fluid pressure actuated device filled with fluid and extending from outside of the anchor plate through said aperture into a brake shoe operating position within said brake drum, and means detachably fastening said device to the anchor plate whereby said device may be completely withdrawn out of said drum through said aperture and from the anchor plate as a sealed fluid filled unit.

3. In a brake for a rotatable wheel hub, a brake drum secured to the wheel hub and having an open end, a non-rotatable anchor plate at the open end of said brake drum and having an aperture therethrough, a brake shoe carried by the anchor plate and movable into and out of braking engagement with said drum, a brake energizing casing extending through said aperture and having a fluid chamber within said drum, a conduit communicating with said chamber from outside of said casing, a brake shoe operating member responsive to changes in fluid pressure in said chamber, means secured to said conduit to produce said fluid pressure changes, mechanism removably fastening the brake energizing casing to the anchor plate in such manner that the casing may be completely withdrawn from said brake drum and from the anchor plate through said aperture, and means preventing fluid leakage from the conduit and casing during the removal of the casing from said anchor plate.

4. In a brake mechanism for a wheel, a brake drum on said wheel, an anchor plate at one end of said brake drum and having an aperture therethrough, a brake shoe carried by the anchor plate and movable into and out of braking engagement with said brake drum, a brake energizing casing extending through said aperture and having a fluid chamber within said brake drum, a shoulder on said casing and engaging the outside of said anchor plate, a brake shoe operating member carried by the casing and responsive to fluid pressure changes within said chamber, a conduit connected to said casing outside of the anchor plate and communicating with said chamber, a fluid completely filling said conduit and said chamber, means producing changes in fluid pressure within said chamber, mechanism demountably fastening said shoulder against the anchor plate, and a member preventing fluid leakage from the conduit and from said casing during the demounting and withdrawal of said casing away from said brake-drum and out of said aperture and from the anchor plate.

5. In a device of the character indicated, an axle, a hub rotatably supported in unit-handling relation with said axle, a brake drum secured to and rotatable with said hub, an anchor plate secured to said axle at one end of the brake drum and having an aperture therethrough, a brake shoe carried by the anchor plate and movable into and out of braking engagement with said brake drum, a hydraulically operated device demountably secured to the outside of said anchor plate and having a fluid chamber within said brake drum, a conduit connected to said device outside of the anchor plate and communicating with said fluid chamber, fluid filling said conduit and said chamber, a brake operating member responsive to fluid pressure changes in said chamber, and means between said chamber and brake operating member whereby said device may be removed from the drum and from the anchor plate through said aperture as a fluid filled unit.

6. In a hub brake for bicycles, a frame having a fork, a pair of separable units removably mounted on the frame, one unit comprising an axle, a hub rotatable on the axle and having a braking surface, an anchor plate fixed to the axle, a brake shoe movably mounted on the anchor plate to engage the braking surface, said one unit fitting in the fork for removal therefrom, the other unit comprising a fluid filled, sealed up, conduit system, the system having a pressure applying device at one end for actuation by the rider and a connected brake energizing casing at the other end to energize the brake shoe, and means for detachably securing the casing to the anchor plate for lateral removal therefrom to provide for release of the axle carried unit from the fork while the system unit remains sealed up.

FREDERICK G. HUGHES.